Figure 1:
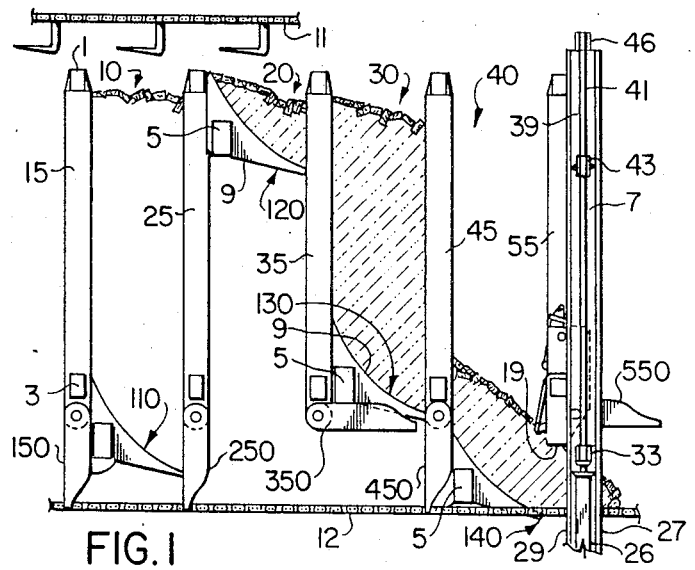

United States Patent [19]

Newnes

[11] Patent Number: 4,815,917
[45] Date of Patent: Mar. 28, 1989

[54] BIN SORTER FOR USE IN A LUMBER MILL

[75] Inventor: William R. Newnes, Salmon Arm, Canada

[73] Assignee: Newnes Machine Limited, Salmon Arm, Canada

[21] Appl. No.: 895,383

[22] Filed: Aug. 11, 1986

[51] Int. Cl.⁴ .............................................. B65G 47/19
[52] U.S. Cl. ..................................... 414/268; 209/521; 209/933; 414/790.6; 414/924
[58] Field of Search ................ 198/447, 451; 209/517, 209/518, 519, 520, 521, 933; 414/28, 49, 268, 98

[56] References Cited

U.S. PATENT DOCUMENTS

| | | | |
|---|---|---|---|
| 2,998,133 | 8/1961 | Rambo | 209/933 X |
| 3,653,506 | 4/1972 | Turner et al. | 209/518 |
| 3,696,948 | 10/1972 | Murdoch et al. | 209/933 X |
| 3,913,744 | 10/1975 | Turner et al. | 414/268 X |
| 4,195,737 | 4/1980 | Rysti | 209/521 |
| 4,281,953 | 8/1981 | Newnes | 414/49 X |

Primary Examiner—Robert J. Spar
Assistant Examiner—Janice Krizek
Attorney, Agent, or Firm—Perry Carvellas

[57] ABSTRACT

A bin sorter divided by vertical or inclined parallel walls into a plurality of bins, each having a bin floor which can be lowered to a lumber discharge station and a series of rotatable gates extending from the bottom of each bin wall and functioning to control the discharge of lumber from the individual bins.

12 Claims, 2 Drawing Sheets

INPUT FROM MANUAL OR AUTOMATIC CONTROL → FROM HYDRAULIC SUPPLY

BIN SORTER FOR USE IN A LUMBER MILL

This invention relates to a bin sorter for use in a lumber mill, wherein cut lumber or logs are collected.

Various types of bin sorters are known, some of which have inclined walls and most of which have sort bins with substantially horizontal bin floors which are either secured in a horizontal disposition for up and down movement parallel to the bin walls or are pivotally mounted such that they can be held substantially horizontal throughout movement between the bin walls and can be released to an inclined position for dumping lumber from the bottom of the bin onto unloading chains which pass therebeneath.

In our U.S. Pat. No. 4,281,953, there is taught a sort bin provided with vertical or near vertical bin walls and having an inclined bin floor which is not pivotable but is rigidly secured to a support which is movable up and down along most of the length of the bin walls. With such a structure, the inclined bin floor can be raised very close to a conventional sorter conveyor passing overhead, thus minimizing the distance that the boards drop from the conveyor to the bin floor and hence reducing damage to the lumber by bruising. The first few boards which drop into the bin land upon the inclined bin floor and slide to the lowest part of the floor against the adjacent bin wall, thus squaring the boards and so achieving a more manageable filling of the sort bin than is possible with a horizontal floor bin. The bin walls are supported between vertical columns along which the bin floors are raised and lowered, and the bin walls have their bottom edges spaced from the unloading chains extending beneath the bins, so that there is clearance for the boards which have discharged from the bin onto the chains to pass beneath the bin walls. Thus, each bin floor discharges its load by lowering it beneath the bottom edge of the adjacent bin wall, so that the boards spill out onto the unloading chains.

The arrangement described above has two disadvantages which the present invention seeks to overcome. Firstly, the discharge of the boards tends to be relatively uncontrolled once the bin floor has cleared the bottom edge of the adjacent wall and, secondly, the bottom boards have a distance to fall which is at least equal to the clearance between the bin walls and the unloader chains, which gives rise to the risk of damage to the boards.

In the present invention, uncontrolled spillage of the boards is prevented by means of gates which can be rotated from a substantially horizontal orientation to extend downwardly from the bin walls over at least the major portion of the clearance between such walls and the unloader chains. In their downwardly extending positions, the gates permit the bin floors to be lowered to just above the unloader chains, whilst the gates respectively function as backstop and frontstop to control spillage of the lumber. The lumber may then be discharged by rotating the forward gate (in the sense of the direction of travel of the unloader chains) into a horizontal position and the boards are then free to fall upon the unloader chains, which carry them away.

Whilst the invention is particularly advantageous for the handling of cut lumber (i.e. boards) from the viewpoint of decreased damage to the boards, it may equally well be adapted to the sorting of logs without substantial modification to the construction and operation of the apparatus and without departure from the spirit and scope of the invention.

Thus, according to the present invention, there is provided a sort bin having substantially vertical or inclined first and second bin walls located in mutually facing, spaced-apart relationship and supported at their ends between vertical or inclined columns;

a bin floor movable along a path extending parallel to said bin walls, said bin floor extending between said walls and mounted to incline downwardly towards said second wall throughout movement of said floor;

means for raising and lowering said bin floor between a raised position adjacent the upper edges of said bin walls and a lowermost position at the region of an unloading conveyor whereby, as the bin is filled with lumber in the form of logs or boards, the bin floor lowers until the bin is full, whereafter further lowering of the bin floor permits the lumber to slide down the bin floor and below the bottom edge of said second wall;

a row of gate members pivotally mounted adjacent the bottom of each of said bin walls and means for rotating each said row of gate members in tandem between substantially horizontal positions and downwardly extending positions wherein said gate members are substantially parallel to said bin walls, the gate members in each row when in their downwardly extending positions functioning as backstops and frontstops, respectively, for lumber contained in said bin when said bin floor is below the bottom edges of said bin walls, said frontstops extending from said second wall and being rotatable from their downwardly extending to their substantially horizontal positions in a direction away from said first wall to enable lumber to discharge from said bin onto said unloading conveyor.

According to a further aspect of the invention, a bin sorter comprises a plurality of sort bins as defined above, divided by said substantially vertical or inclined bin walls, said first wall of a first of said bins comprising said second wall of an immediately preceeding bin and said second wall of said first bin comprising said first wall of an immediately succeeding bin, whereby said row of gate members extending from said first wall of said first bin comprises a backstop for lumber contained within said first bin and a frontstop for lumber contained within said immediately preceding bin and said row of gates extending from said second wall of said first bin comprises a frontstop for lumber contained within said first bin and a backstop for lumber contained within said immediately succeeding bin.

In a preferred embodiment of the invention, the gate members in each row are keyed (for example, by welding) to a common shaft, by means of which said gate members are rotatable in tandem between their horizontal and vertical positions.

In a further preferred embodiment of the invention, each bin floor comprises a plurality of spaced, downwardly inclined arms connected by a horizontal beam extending therebetween.

Figure 2:
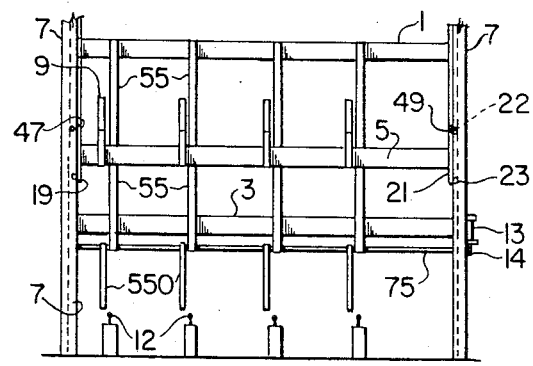
Figure 3:
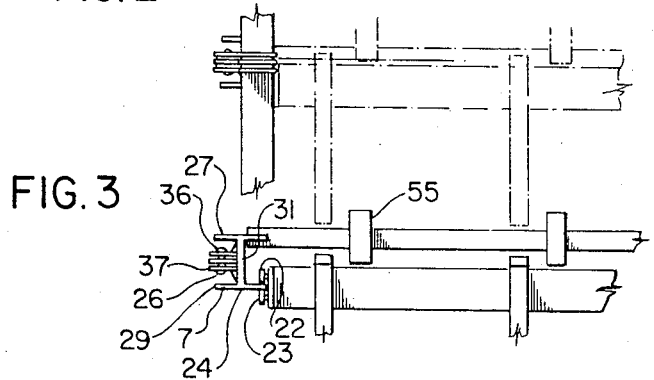

The invention will now be described further by way of example only and with reference to the accompanying drawings, wherein:

FIG. 1 illustrates a bin sorter according to a preferred embodiment of the invention;

FIGS. 2 and 3 respectively illustrate end and partial top views, respectively, of the bin sorter of FIG. 1; and FIGS. 4 through 7 respectively illustrate the operation of the bin sorter of FIG. 1 by reference to a single sort bin, shown in side view.

Figure 8:
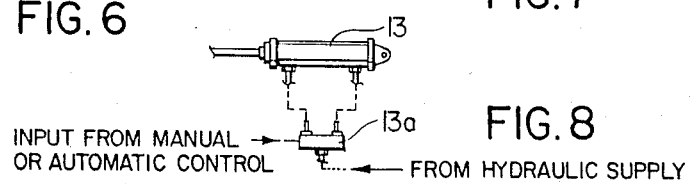

FIG. 8 shows controls for hydraulic means for unloading the bins.

Referring now to the drawings and particularly to FIGS. 1, 2 and 3, the bin sorter comprises sort bins 10, 20, 30, 40, which are constructed with common walls between adjacent bins, each wall having an upper horizontal beam 1, a lower horizontal beam 3, and vertical beams 15, 25, 35, 45, 55 respectively. These beams are all in the form of box or wide flange girders. The bin walls are supported between spaced apart vertical columns 7 (only one of which is shown in FIG. 1). The columns and bin walls can be fabricated either by welding, riveting or bolting, or by a combination of any of these.

Each bin has a vertically movable bin floor 110, 120, 130, 140, respectively, and each bin floor consists of a horizontal beam 5 (again, in the form of a box girder) upon which are secured by welding and brackets (not shown) a number of contoured arms 9 which are spaced apart along the beam 5 at a distance adequate to support the boards without letting any fall between the box members. Each arm 9 is formed with a concave bearing surface for the lumber, and each arm is downwardly inclined to optimize filling of the bin and to enable the boards to discharge therefrom onto the unloader conveyor 12.

As in the structure described in the aforesaid U.S. Pat. No. 4,281,953, at each end of beam 5 there is attached a carriage in the form of a flat plate 19, 21 by welding or the like, each plate having an upper roller 22 and a lower roller 23 which respectively are behind and in front of the inner front flanges 24 of columns 7. Therefore, the plates 19 and hence the bin floors are movable vertically along the columns 7.

In order to control the movement of the bin floors, any type of suitable hydraulic, compressed air, or electric mechanism can be utilized, one type being shown in FIGS. 1 and 3 for illustrative purposes. In the operating mechanism shown, a hydraulic or compressed air cylinder 26 is mounted outside the web 31 of column 7 and between the outer flanges 27 and 29. The mounting of cylinder 26 can be through mounting lugs on the ends of the cylinder which can be secured by bolts (not shown) to web 31. The piston rod is provided with a pulley 33 having twin grooves 36 and 37 (see FIG. 3), and two cables 39 and 41 are secured to an attachment 43 on column 7, pass around pulley 33, pass over a double groove pulley 46 secured above the head of column 7, one cable then passing down the inside of column 7 to be secured to plate 19 at 47 (FIG. 2) while the other cable passes above the top of the bin wall, over a pulley (not shown) above column 7 and then passes down the inside of the opposite column 7 to be secured to plate 21 at 49. Instead of rollers 22 and 23, plastic guides secured to plates 19 and 21 and travelling along flanges 27 and 29 of the columns 7 may be used, as will be apparent to those skilled in the art—the specific construction of the mounting arrangement for the beams 5 for movement along the columns not forming part of the present invention.

Each vertical beam 15 through 55 terminates at its lower extremity above the unloader chains 12 with sufficient clearance to permit the passage of boards therebeneath in conventional fashion. Pivotally mounted upon the lower extremity of each vertical beam 15 through 55 is a gate 150, 250, 350, 450, 550, respectively. The gates are swingable between vertical and horizontal positions and are actuated through a common shaft 75 and a piston rod and crank arrangement 13, 14, (see FIG. 4, from which the mechanism for raising and lowering the bin floors has been omitted for the sake of clarity).

Figure 4:
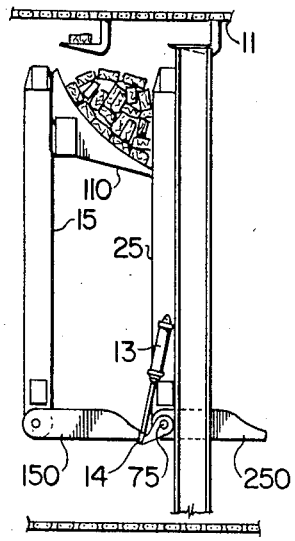
Figure 5:
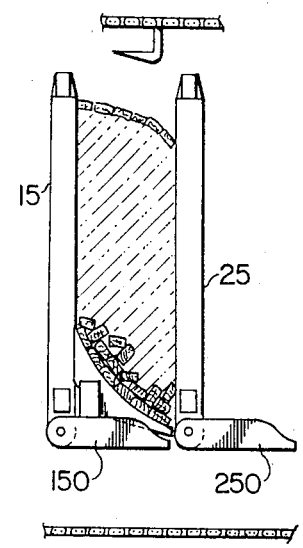
Figure 6:
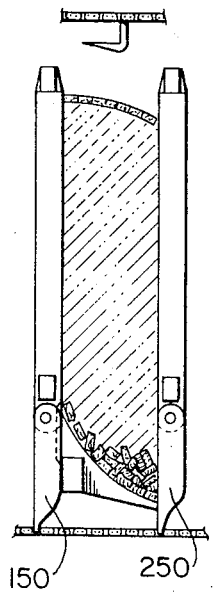
Figure 7:
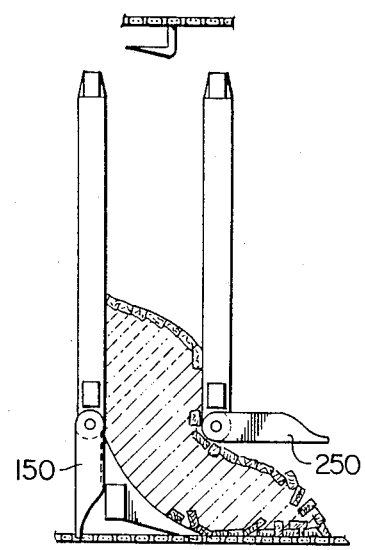

Turning now to FIGS. 4 through 7, there is shown the sequence of operation of each bin floor by reference to the rotatable gates of the first bin 10. Initially, the floor 110 is raised to its maximum height and receives boards 51 from a conveyor 11 (FIG. 4). As the bin fills, the bin floor is lowered towards the bottom of the beams 15 and 25, as shown in FIG. 5. The gates 150 and 250 are both shown in horizontal position but they could be horizontal or vertical, depending upon the condition of the preceding and succeeding bins, as will become apparent. When the operator dumps the bin, both gates 150 and 250 swing downwardly into their vertical positions (if they are not already vertical) so that as the floor is lowered further, (FIG. 6), the gate 150 acts as a backstop and the gate 250 acts as a frontstop, which serve to confine the boards and prevent them from spilling out. Finally, to discharge the boards onto the conveyor, the gate 250 is swung into its horizontal position and the boards are then free to discharge onto the conveyor 12 (FIG. 7). The bin floor is then raised back into the position of FIG. 4 to resume receiving lumber from the conveyor 11.

FIG. 1 shows the orientation of the gates 150 through 550 relative to the positions of the bin floors 110 through 140 in the four bins 10 through 40. Floor 110 is in its lowest position ready to discharge its lumber. Consequently arms 150 and 250 extend downwardly to act as backstop and frontstop to prevent spillage as described above. Floor 120 is in its highest position and floor 130 is on its way down.

Gate 350 extends horizontally, since it was swung into this position to allow dumping of the bin 20 when the floor 120 was in its "dump" position, prior to its return to the position shown in FIG. 1. Gate 350 will now be swung downwardly to act as backstop for boards in the floor 130 as the latter continues its downward movement. Gate 450 is already vertical, acting as backstop for boards being dumped from bin 40 and gate 450 simultaneously acts as frontstop for bin 30. Gate 550 is horizontal to allow the dumping of boards from bin 40 to proceed.

Control for the gates may be accomplished manually, semiautomatically or fully automatically and may conveniently be integrated with the manual or computerized controls for raising and lowering the bin floors—such controls being entirely conventional and not forming part of this invention. Thus, each hydraulic cylinder 13 may be fed from a hydraulic supply through a solenoid valve 13a (see FIG. 8), which is actuated to apply hydraulic pressure to appropriate side of the piston within the cylinder 13 to raise or lower the gate.

Under automatic control, a central controller for raising and lowering the bin floors applies appropriate signals to the solenoid valves controlling the hydraulic cylinders for the frontstop and backstop gates. When the bin floor is lowered and it is determined that the unloader chains below the bin are clear, the controller signals the solenoid valves to cause the gates to drop into their lowered positions. When the bin floor reaches its lowermost position from which the lumber may be dumped, the controller signals the frontstop to be raised and thus permit the lumber to discharge onto the unloader chains. Once the bin has emptied, the bin floor is raised either automatically or at the command of the operator and after a pre-determined time count, the controller causes the frontstop to rotate back into its vertical position.

Whilst the invention has been described specifically by reference to vertical sort bins, it will be apparent that the concept is equally applicable to bins having inclined walls. Just as the gates in the embodiment described above effectively form extensions of the bin walls when the gates are in their vertical positions—thus permitting the bin floors to be lowered without spillage of the lumber—the gates of a sorter having inclined bin walls effectively form extensions of the walls when the gates are in their lowered positions. Thus, in this case, the gates do not swing into vertical orientations but, rather, into positions which are parallel to the bin walls and therefore have similar inclinations from vertical.

The embodiments of the invention in which an exclusive property or privilege is claimed are defined as follows:

1. Sort bins having substantially vertical or inclined first and second bin walls located in mutually facing, spaced-apart relationship and supported at their ends between vertical or inclined columns;
   a bin floor movable along a path extending parallel to said bin walls, said bin floor extending between said walls and mounted to incline downwardly towards said second wall throughout movement of said floor;
   means for raising and lowering said bin floor between a raised position adjacent the upper edges of said bin walls and a lowermost position at the region of an unloading conveyor whereby, as the bin is filled with lumber in the form of logs or boards, the bin floor lowers until the bin is full, whereafter further lowering of the bin floor permits the lumber to slide down the bin floor and below the bottom edge of said second wall;
   a row of gate members pivotally mounted adjacent the bottom of each of said bin walls and control means for rotating each said row of gate members in tandem between substantially horizontal positions and downwardly extending positions substantially parallel to said bin walls, the gate members in each row when in their downwardly extending positions functioning as backstops and frontstops, respectively, for lumber contained in said bins when said bin floor is below the bottom edges of said bin walls, said frontstops extending from said second wall and being rotatable in a direction away from said first wall from their downwardly extending positions to their substantially horizontal positions to enable lumber to discharge from said bins onto said unloading conveyor.

2. Sort bins as claimed in claim 1, wherein said gate members in each row are keyed to a common shaft by means of which said gate members are rotatable in tandem between their horizontal and vertical positions.

3. Sort bins as claimed in claim 1 or claim 2, wherein said bin floor comprises a plurality of spaced downwardly inclined arms connected by a horizontal beam extending therebetween.

4. A bin sorter comprising a plurality of sort bins as defined in claim 1, divided by said substantially vertical or inclined bin walls, said first wall of a first of said bins comprising said second wall of an immediately preceeding bin and said second wall of said first bin comprising said first wall of an immediately succeeding bin, whereby said row of gates extending from said first wall of said first bin comprises a backstop for lumber contained within said first bin and a frontstop for lumber contained within said immediately preceding bin and said row of gate members extending from said second wall of said first bin comprises a frontstop for lumber contained within said first bin and a backstop for lumber contained within said immediately succeeding bin.

5. A bin sorter as claimed in claim 4, wherein said gate members in each row are keyed to a common shaft by means of which said gate members are rotatable in tandem between their horizontal and vertical positions.

6. A bin sorter as claimed in claim 4 or claim 5, wherein each said bin floor comprises a plurality of spaced downwardly inclined arms connected by a horizontal beam extending therebetween.

7. Sort bins having substantially vertical first and second bin walls located in mutually facing, spaced-apart relationship and supported at their ends between vertical columns;
   a vertically movable bin floor extending between said walls and mounted to incline downwardly towards said second wall throughout vertical movement of said floor;
   means for raising and lowering said bin floor between a raised position adjacent to the upper edges of said bin walls and a lowermost position at the region of an unloading conveyor whereby, as the bin is filled with lumber in the form of logs or boards, the bin floor lowers until the bin is full, whereafter further lowering of the bin floor permits the lumber to slide down the bin floor and below the bottom edge of said second wall;
   a row of gate members pivotally mounted adjacent the bottom of each of said bin walls and control means for rotating each said row of gate members in tandem between substantially horizontal and vertically downwardly extending positions, the gate members in each row when in their vertical positions functioning as backstops and frontstops, respectively, for lumber contained in said bins when said bin floor is below the bottom edges of said bin walls, said frontstops extending from said second wall and being rotatable in a direction away from said first wall to their horizontal positions to enable lumber to discharge from said bins onto said unloading conveyor.

8. Sort bins as claimed in claim 7, wherein said gate members in each row are keyed to a common shaft by means of which said gate members are rotatable in tandem between their horizontal and vertical positions.

9. Sort bins as claimed in claim 7 or claim 8, wherein said bin floor comprises a plurality of spaced downwardly inclined arms connected by a horizontal beam extending therebetween.

10. A bin sorter comprising a plurality of sort bins as defined in claim 7, divided by said substantially vertical bin walls, said first wall of a first of said bins comprising said second wall of an immediately preceding bin and said second wall of said first bin comprising said first wall of an immediately succeeding bin, whereby said row of gates extending from said first wall of said first bin comprises a backstop for lumber contained within said first bin and a frontstop for lumber contained within said immediately preceding bin and said row of gate members extending from said second wall of said first bin comprises a frontstop for lumber contained within said first bin and a backstop for lumber contained within said immediately succeeding bin.

11. A bin sorter as claimed in claim 10, wherein said gate members in each row are keyed to a common shaft by means of which said gate members are rotatable in tandem between their horizontal and vertical positions.

12. A bin sorter as claimed in claim 10 or claim 11, wherein each said bin floor comprises a plurality of spaced downwardly inclined arms connected by a horizontal beam extending therebetween.

* * * * *